June 10, 1969   R. B. LAWRENCE ET AL   3,449,708
FEED-THROUGH TERMINAL JUNCTION

Filed Dec. 12, 1967                Sheet 1 of 4

INVENTORS.
GEORGE H. HARNACK
ROLAND B. LAWRENCE
BY
ATTORNEYS.

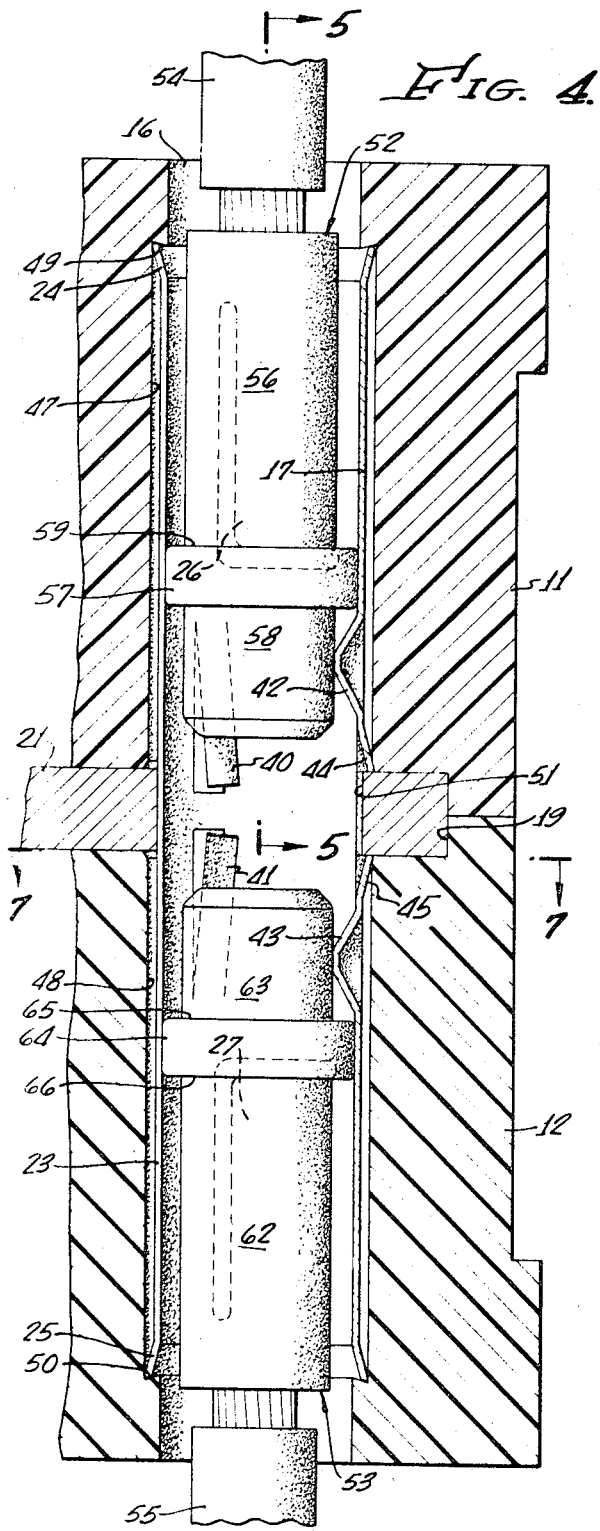
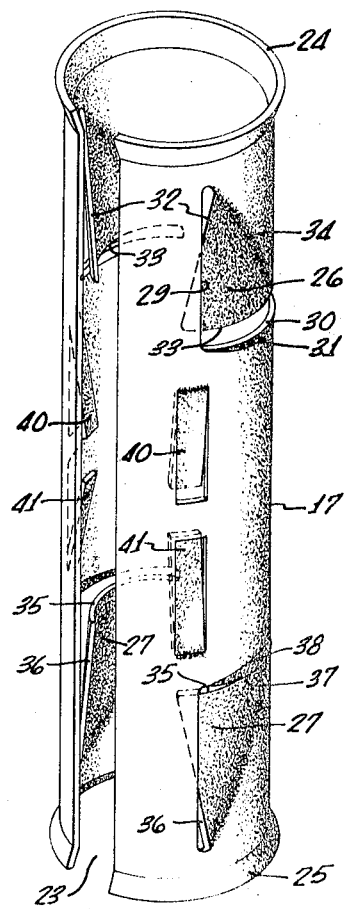
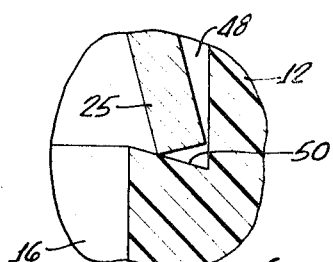

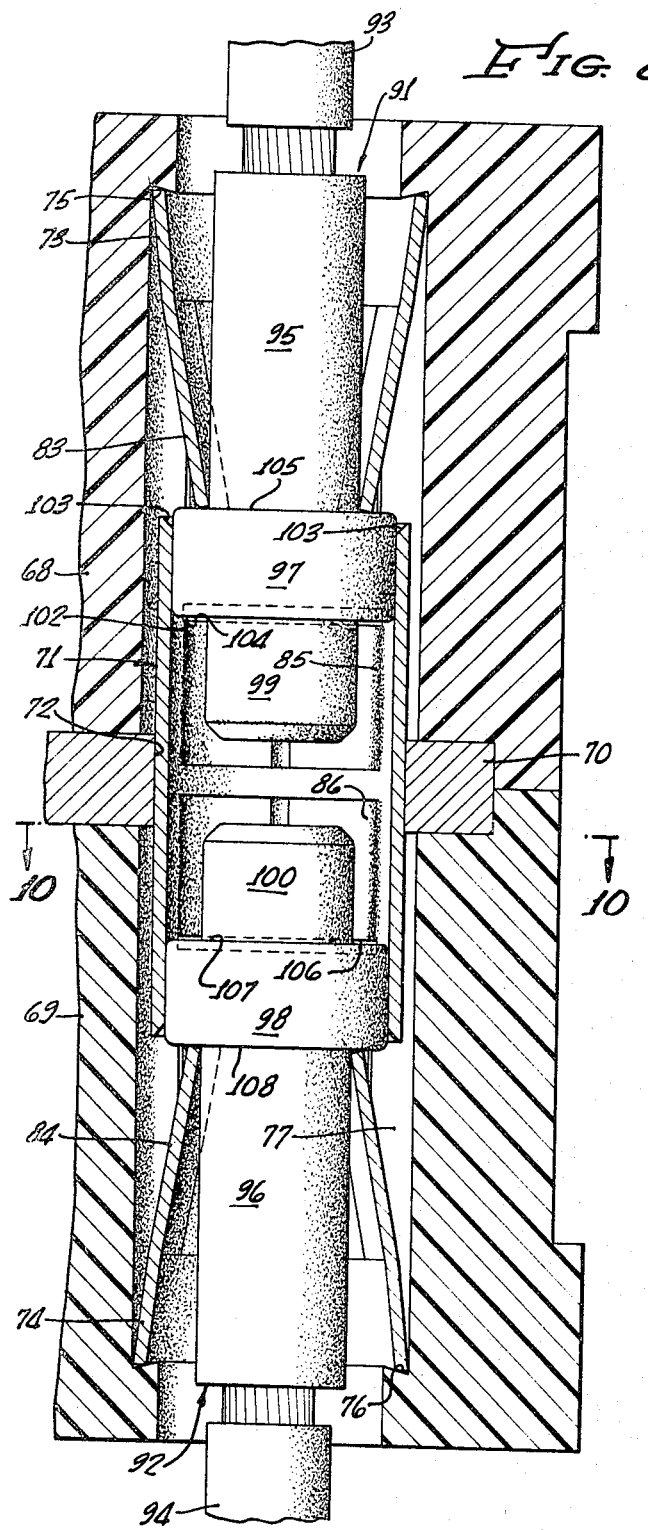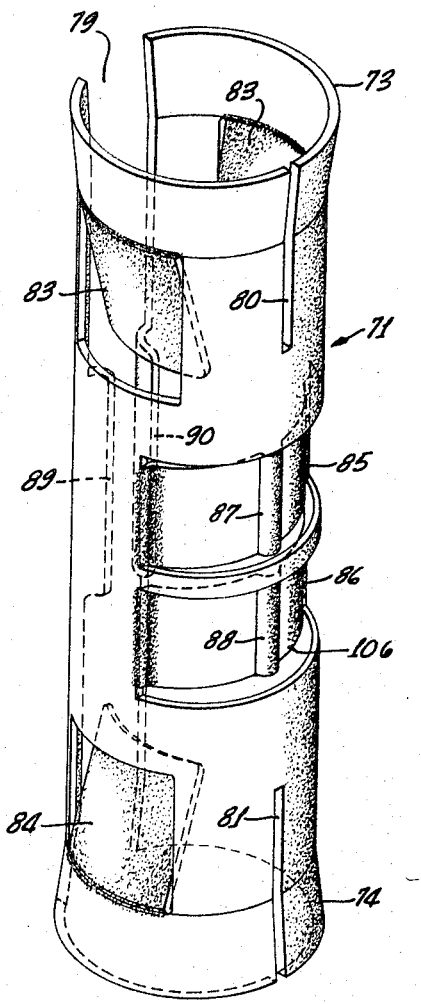

United States Patent Office 3,449,708
Patented June 10, 1969

3,449,708
FEED-THROUGH TERMINAL JUNCTION
Roland B. Lawrence, Banning, and George H. Harnack, Calimesa, Calif., assignors to The Deutsch Company Electronic Component Division, Banning, Calif., a corporation of California
Filed Dec. 12, 1967, Ser. No. 689,913
Int. Cl. H01r *13/50, 9/08*
U.S. Cl. 339—198        21 Claims

ABSTRACT OF THE DISCLOSURE

A terminal junction device including a housing of dielectric material receiving a bus, the housing and bus having a plurality of bores therethrough, tubular retainer members in the bores, and a contact inserted from either end into the retainer member, the retainer member having inwardly directed portions engaging the contacts to hold the contacts in place and to provide an electrical connection therewith and produce an electrical circuit from the contacts through the retainer member to the bus.

BACKGROUND OF THE INVENTION

Field of the invention

This invention relates to electrical connectors, particularly electrical terminal devices.

The prior art

A conventional terminal junction utilizes a strip having a plurality of threaded studs which receive ends of electrical conductors and which are held in place by nuts. A more compact, lighter and easily used design provides a bus within a housing provided with a number of openings receiving contacts on one side. There is no prior design, however, which will provide a feed-through between conductors inserted from one side and those on another, with the contacts being of standard design and installed and removed by conventional tooling.

SUMMARY OF THE INVENTION

The present invention provides an electrical termination device in which a module contains one or more bus bars and a plurality of open-ended sleeves received within openings in the housing and bus bars. Each sleeve is of electrically-conductive material and adapted to receive an electrical contact at either end. Each contact has forward and rearward shoulders, the latter being engaged by resilient tabs inclined inwardly from the sleeve to hold the contact against removal. The retainer clip also includes an abutment engaged by the forward shoulder of the contact so that the contact is positioned against longitudinal movement within the retainer. An enlarged part of the contact engages the wall of the retainer, and inwardly directed portions of the retainer forwardly of the shoulders engage the end portion of the contact for forming an electrical connection with it. Thus, there is an electrical circuit between each of the contacts and the retainer clip, which, in turn, is connected to the bus bar. Current, therefore, can be transmitted between the conductors of the contacts in each retainer, and to the bus bar and the other contacts in circuit with it.

The contact is removed by prying the inwardly inclined tabs outwardly to free the rearward shoulder, permitting the contact to be pulled from the opening that receives it. Standard tooling for rear-release electrical connector systems is used in both installing and removing the contacts.

An object of this invention is to provide a device for rapidly and easily interconnecting a plurality of electrical conductors.

Another object of this invention is to provide a simplified electrical termination device utilizing a rear-release system of contact retention.

A further object of this invention is to provide an improved feed-through electrical termination device for interconnecting desired numbers of electrical conductors.

An additional object of this invention is to provide a feed-through electrical termination device of improved performance, yet which utilizes installation and removal tooling identical to that employed with other electrical terminal junctions and multiple pin-and-socket connectors.

Yet another object of this invention is to provide a feed-through terminal junction device adapted for construction in modules that can be assembled in a side-by-side relationship.

These and other objects will become apparent from the following detailed description taken in connection with the accompanying drawing.

BRIEF DESCRIPTION OF THE DRAWING

FIGURE 3 is an enlarged perspective view of one of the retainer members removed from the remainder of the terminal junction;

FIGURE 4 is an enlarged fragmentary sectional view taken along line 4—4 of FIGURE 2;

FIGURE 6 is an enlarged fragmentary view illustrating the engagement between the end of the retainer member and the shoulder of the housing;

FIGURE 8 is a fragmentary sectional view generally similar to FIGURE 4, but of a modified form of the terminal junction;

FIGURE 9 is an enlarged perspective view of the retainer member of FIGURE 8 removed from the remainder of the terminal junction;

DESCRIPTION OF THE PREFERRED EMBODIMENT

Figure 1:
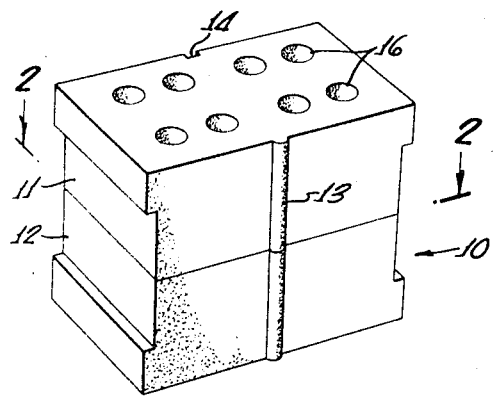
FIGURE 1 is a perspective view of a module of the terminal junction device of this invention.

The electrical terminal device of this invention is adapted to be incorporated in modules 10, such as shown in FIGURE 1, which may be used singly or in multiples in a side-by-side relationship. Each module includes a housing made up of mating sections 11 and 12 of dielectric material. A rib 13 runs transversely of one wall of the housing, and a recess 14 is provided on the opposite side. The ribs 13 are adapted to enter the recesses 14 of adjoining modules 10 to facilitate the alignment and mounting of multiple numbers of the modules.

Figure 2:
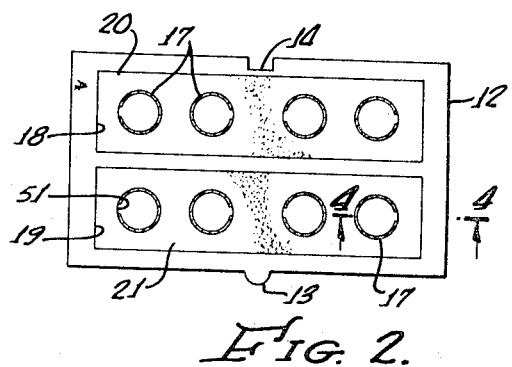
FIGURE 2 is a sectional view taken along line 2—2 of FIGURE 1.
Figure 7:
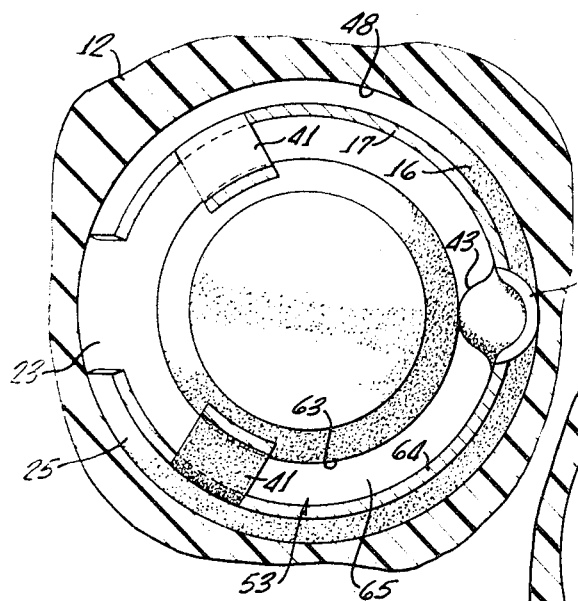
FIGURE 7 is a transverse sectional view taken along line 7—7 of FIGURE 4.
Figure 10:
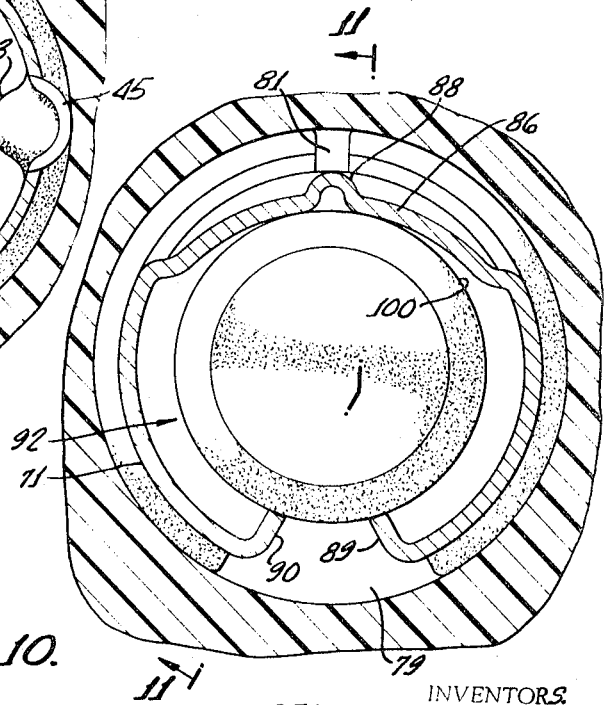
FIGURE 10 is a transverse sectional view taken along line 10—10 of FIGURE 8.

A plurality of openings 16 extend through the module and receives retainer members 17 of electrically-conductive resilient material, such as beryllium copper. A bus arrangement also is included within the module 10. In the embodiment shown in FIGURE 2, the mating faces of the housing sections 11 and 12 are provided with recesses 18 and 19 that receive two bus bars 20 and 21 through each of which extend four of the retainer members 17. The bus arrangement may be varied to suit conditions. For example, there may be a single recess that receives one larger bus bar for all of the retainer members 17. Alternatively, there may be three or four appropriately dimensioned bus bars retained within the housing.

Each retainer member 17, as illustrated in the enlarged perspective view of FIGURE 3, is in the form of an elongated cylindrical sleeve having a longitudinal slot 23 extending through it from one end to the other. The opposite ends are outwardly flared, being defined by short frustoconical sections 24 and 25.

Inwardly of the end 24 in the cylindrical portion of the member 17 is a pair of resilient tabs 26. A similar pair of tabs 27 is located inwardly of the opposite end 25. These tabs are formed by making L-shaped cuts in the cylindrical wall of the retainer member, and then bending the tabs laterally inwardly along their lines of connection with this wall. The cuts are made longitudinally and circumferentially in the retainer member, giving the retainer member a longitudinal edge 29 and a transverse edge 30 adjacent each of the tabs 26. The edges 30 are bent outwardly so that there is a short outwardly flaring wall 31 next to each of the edges 30. The tabs 26 have longitudinally extending edges 32 and forward circumferential edges 33. Each tab 26 connects to the cylindrical portion of the member 17 along a line 34 that extends between the spaced ends of the edges 32 and 33.

Similarly, the tabs 27 have circumferential forward edges 35 and longitudinal edges 36. The transverse edges 37 of the retainer member adjacent the tabs 27 are at the ends of short outwardly bent portions 38.

A pair of resilient tabs 40 is located forwardly of the tabs, these being relatively thin straight elongated elements that incline forwardly toward the center of the sleeve 17 and inwardly toward its axis. The two tabs 40 are on opposite sides of the slot 23, but are relatively close to the slot so that they both are positioned on the same side of the cylindrical portion of the member 17. In other words, both tabs 40 are on the same side of a diameter of the member 17.

A similar pair of tabs 41 is provided inwardly of the tabs 27. The tabs 41 are aligned with the tabs 40, but incline in the opposite direction from the tabs 40.

Opposite from the tabs 40, a dimple or generally domeshaped inward protrusion 42 is formed in the wall of the retainer member 17. A second localized inward protrusion 43 is opposite the tabs 41. Beyond the protrusions 42 and 43 are short opposed outwardly flaring abutments 44 and 45.

The openings 16 in the housing members 11 and 12 include portions 47 and 48 of enlarged diameter between the ends of the openings and the bus bar 21. Undercut annular shoulders 49 and 50 are defined at the ends of the enlarged portions of the openings.

The retainer members 17 have a length substantially the same as the spacing between the shoulders 49 and 50. When the module 10 is assembled, the outwardly flaring ends 24 and 25 extend to the shoulders 49 and 50, so that the members 17 are retained within the housing. The central portion of each of the members 17 is received within one of the openings 51 through the bus bar. The longitudinal slot 23 of the member 17 allows it to be compressed so that one of its ends may be inserted into the opening 51 in assembling the device. The member 17 in its free position is slightly larger in diameter than the opening 51 so that, when extended through the bus bar, it is biased outwardly against the wall of the opening and makes a good contact with the bus bar. This provides a low-resistance current path between the retainer 17 and the bus when the device is in use. The outwardly directed abutments 44 and 45 fit on either side of the bus bar to assist in positioning the member 17 axially within the opening 16.

Figure 5:
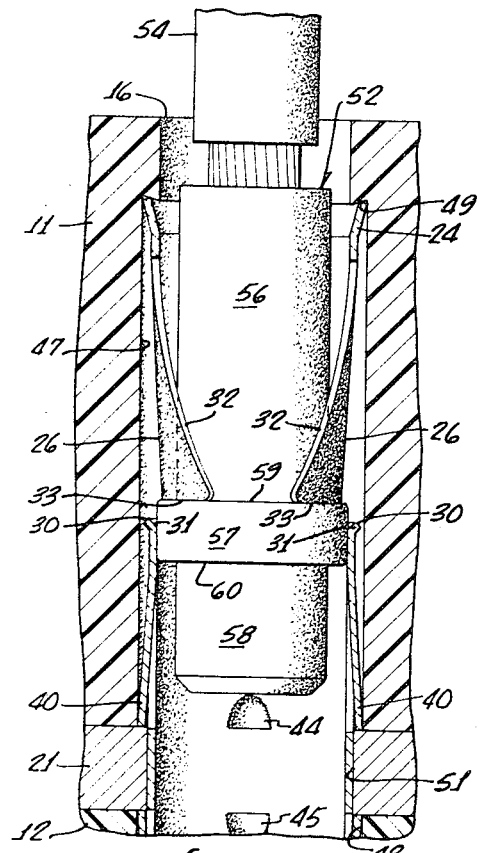
FIGURE 5 is a fragmentary sectional view taken along line 5—5 of FIGURE 4.

Each of the tubular members 17 is adapted to receive two electrical conductors when the device is in use. In the illustration of FIGURES 4 and 5, pin contacts 52 and 53 at the ends of wires 54 and 55 extend into the opposite ends of the opening 16 and the retainer member 17 within it. The contact 52 includes a hollow barrel 56 at one end which receives the end of the wire 54 and is crimped to it. This connects the wire to the contact. Beyond the barrel 56 the contact includes a short portion 57 of enlarged diameter, and forwardly of that is the projecting pin portion 58. Radial rearward and forward shoulders 59 and 60 are provided between the sections 56 and 57, and 57 and 58, respectively.

The contact 53 is identical in configuration to the contact 52, including a barrel 62 that receives the end of the wire 55, a projecting pin portion 63 at the opposite end, and an enlarged section 64 intermediate the barrel 62 and the pin projectiton 63. This provides the contact 53 with forward and rearward radial shoulders 65 and 66. The pin contacts 52 and 53 may be the same as contacts used in other electrical terminal and connecting devices where the projecting pin ends are received in socket openings.

A standard tubular insertion tool is used in installing the contacts 52 and 53. The contact 52 is pushed into the opening 16 from the upper end of the assembly, as the device is shown in FIGURES 4 and 5, moving past the tabs 26 as it enters the retainer member 17. As this occurs, the forward shoulder 60 of the enlarged portion 57 of the contact 52 engages the inclined edge 32 of each tab 26, which deflects the tabs 26 outwardly and allows the inward movement of the contact. The short inclined walls 31 at the circumferential edges 30 of the retainer 17 help the shoulder 60 to be able to pass the edges 30 without becoming caught on them.

The contact 52 is moved into the retaining member 17 until the forward shoulder 60 is adjacent the inward protuberance 42 of the retainer member. The protuberance interferes with the forward contact shoulder 60 and forms a stop that limits the forward travel of the contact 52 (see FIGURE 4). When the contact reaches this position, the tabs 26 snap inwardly so that the corners between the tab edges 32 and 33 bear against the periphery of the barrel 56. This positions the circumferential edges 33 of the tabs immediately behind the shoulders 59, as shown in FIGURE 5. Therefore, the edge 33 of the tabs 26 prevent the contact 52 from being withdrawn. As a result, the contact 52 is held in position axially relative to the retaining member by the tabs 26 and the protuberances 42.

The insertion and retention of the contact 53 is similar to that of the contact 52. The inward protuberance 43 acts as the forward stop for the abutment shoulder 65 of the contact 53, while the edges 35 of the tabs 27 cooperate with the rearward abutment shoulder 66 to prevent withdrawal of the contact 53.

Each of the contacts makes a low-resistance electrical connection with the retainer clip 17. The enlarged portions 57 and 64 fit snugly within the retainer member 17, bearing against the inner circumferential surface of it so that current can flow between these portions of the contacts and the wall of the retainer member 17. At the forward portions 58 and 63 of the contacts, the resilient tabs 40 act as wipers and can conduct additional current between the contacts and the retainer. The tabs 40 and 41, bearing against the forward portions 58 and 63 of the contacts, also produce lateral resultant forces holding these portions of the contacts in firm engagement with the protuberances 42 and 43 of the retainer member 17. Each of the protuberances 42 and 43 at the location of the engagement with a contact, provides another path through which the current can flow. Additional current may be carried through the tabs 26 and 27, which bear against the peripheries of the contacts 52 and 53.

Thus, a good connection with multiple current paths and attendant low resistance is assured from the contacts to the retaining member 17, and, in turn, to the bus bar 21. In this manner, the wires 54 and 55 are interconnected, as are those for any other contacts received in the retainer members that pass through the bus bar 21. The terminal junction, therefore, provides a feed-through electrical connecting device that interconnects desired numbers of electrical conductors with little resistance to the flow of current. Assembly is very easily effected, and the contacts are readily associated with the device by merely pushing them axially into the openings. The retainer members of the device serve the dual functions of holding the contacts in place and forming an electrical connection therewith. While normally each retainer receives two contacts, in some instances only one end will be utilized in this manner, connecting a single contact to the bus.

Removal of the contacts also is a simple operation. To accomplish this, a standard tubular removal tool such as shown in Patent 3,110,093, may be utilized, which is advanced inwardly from the outer end of the opening to deflect the retainer tabs outwardly. Thus, for the tabs 26, the removal tool will ride along the edge 32 to bend the tabs outwardly, freeing the shoulder 59 from the edges 33 of the tabs. The contact 52 then is released and may be pulled from the opening in the terminal junction device by means of the wire 54. Removal of the contact 53 is accomplished in the same manner by deflecting the tabs 27 outwardly to move their edges 35 away from the shoulder 66 of the contact 53. At that time, the contact 53 no longer is held and may be extracted.

Figure 11:
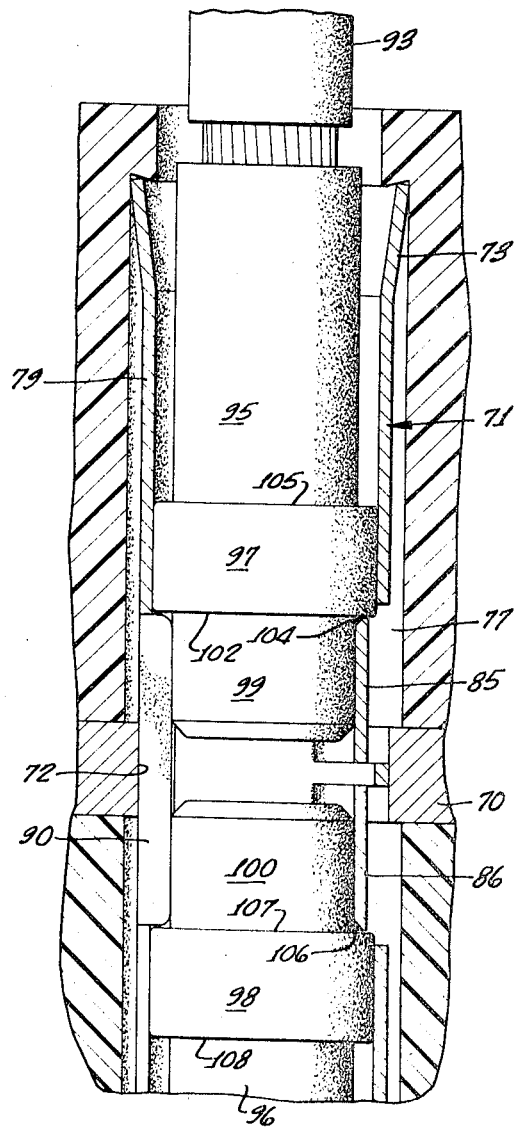
FIGURE 11 is a sectional view taken along line 11—11 of FIGURE 10.

The embodiment of FIGURES 8–12 accomplishes the same result as the previously described arrangement and is particularly adapted for use with terminal junctions of larger sizes. Here, the section 68 and 69 of the housing are recessed to retain a bus bar 70, as in the arrangement described above. The bus bar 70 is provided with a plurality of openings to receive the tubular contact retaining members. In FIGURES 8 and 11, one of the retainer members 71 is shown extending through the opening 72 in the bus bar 70. The opposite ends 73 and 74 of the members 71 are outwardly flaring and held by undercut shoulders 75 and 76 in the bore 77 through the housing members 68 and 69. This provides the sole means for positioning the retainer member 71 as there are no tabs at the location of the bus bar. It would be possible also to omit the tabs 44 and 45 in the previously described embodiment, holding the retainer member 17 entirely through the shoulders in the opening through the housing.

The retainer member 71 is a split cylindrical sleeve having a longitudinal slot 79 extending through it. Additional longitudinal slots 80 and 81, opposite from the slot 77, extend inwardly from the ends of the member 71 for only a part of its length. The presence of the slots 80 and 81 renders the ends of the member 71 more compressible to facilitate their movement through the opening 72 in the bus bar when the terminal junction is being assembled.

Adjacent the end portion 73 is a pair of inwardly and forwardly inclined opposed spring tabs 83. A similar pair of tabs 84 is located adjacent the opposite end portion 74.

Adjacent the center portion of the retainer member 71, on one side of this element, are inwardly displaced wall sections 85 and 86. These are formed by making circumferential cuts in the material and displacing the sections 85 and 86 inwardly toward the axis. Longitudinal ribs 87 and 88 on the outer surfaces of the sections 85 and 86 merely accommodate the excess material resulting from the formation of the inwardly displaced portions 85 and 86.

Opposite from the portions 85 and 86 of the member 71 are longitudinal flanges 89 and 90 that project inwardly from the edges of the slot 79. The flanges 89 and 90 are as long as the combined lengths of the portions 85 and 86.

Each opening in the terminal junction device is adapted to receive two pin contacts, such as the contacts 91 and 92 at the opposite ends of the opening 77, as shown in FIGURE 8. These contacts connect to wires 93 and 94 which are received within and crimped to the barrel portions 95 and 96 of the contacts. The contacts 91 and 92 have identical forms, with enlarged portions 97 and 98 positioned inwardly of their projecting pin portions 99 and 100.

When the contact 91 is pushed into the opening 77, its forward shoulder 102 engages the inner surfaces of the opposed spring tabs 83. This deflects the tabs outwardly, allowing the contact to move forwardly into the retaining member 71. The transverse edges 103 of the retainer sleeve adjacent the forward ends of the tabs 83 are beveled, as seen in FIGURE 8. This facilitates movement of the contact shoulder 102 past these edges without obstruction as the contact is slid into the retaining member. Similarly, the edge 104 of the inwardly displaced portion 85 is beveled, and the corners of the flanges 89 and 90 are rounded, to avoid any hindrance to the movement of the forward end of the pin portion 99 of the contact 91. Movement of the contact into the retainer is limited by the edge 104 of the section 85 and the ends of the flanges 89 and 90, which act as stops to the forward shoulder 102 of the contact, as illustrated in FIGURE 11. When the contact has been inserted this far, the opposed resilient tabs 83 snap inwardly behind the rearward shoulder 105 of the contact 91 to the position of FIGURE 8. In this manner, the contact 91 is held against substantial axial movement in either direction.

The other contact 92 is retained between the edge 106 of the section 86 and the opposite ends of the flanges 89 and 90 at its forward shoulder 107, and the ends of the tabs 84 that snap behind the rearward contact shoulder 108.

The enlarged contact portions 97 and 98 fit snugly within the cylindrical part of the retainer member 71, resulting in a good electrical connection around the periphery of these portions. In addition, the inner edges of the flanges 89 and 90 bear against the pin ends 99 and 100 of the contacts and hold them against the walls of the inwardly displaced portions 85 and 86. A further electrical connection is formed between the ends 99 and 100 of the contacts and the walls of the sections 85 and 86 of the retainer member 71. Current also can flow through the flanges 89 and 90. The tabs 83 and 84, which bear against the contacts, additionally can conduct current. Thus, again, there are many paths for the current to follow, and a low-resistance connection is made between the wires 93 and 94 and to the bus bar 70.

This feed-through connection is accomplished very easily, simply by pushing the contacts 91 and 92 into the opposite ends of the opening 75. Standard pin contacts usable with other electrical connecting devices may be employed.

Figure 12:
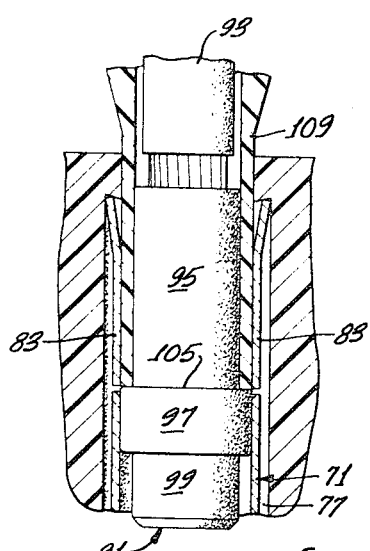
FIGURE 12 is a fragmentary sectional view illustrating the release of the contact from the retainer member.

Removal of the contacts 91 and 92 is effected merely by deflecting the tabs 83 and 84 outwardly to free the shoulders 105 and 108. A tubular tool 109 inserted into the end of the opening 77 around the contact, as shown in FIGURE 12, will accomplish this release operation. The removal tools may be the same as those used for other rear-release electrical terminal retention systems.

The foregoing detailed description is to be clearly understood as given by way of illustration and example only, the spirit and scope of this invention being limited solely by the appended claims.

We claim:

1. An electrical terminal device comprising
a body of dielectric material,
a bus in said body,
    said body and said bus having at least one bore therethrough,
a retainer member in said bore engaging said bus in electrically conductive relationship therewith,
and a duality of electrical contacts in said bore,
    each of said contacts having an abutment,
        said abutments being directed toward opposite ends of said bore, said retainer member including means engaging said contacts for providing an electrical connection therewith, said means engaging said contacts including inwardly inclined tab means having portions adjacent said abutments of said contacts for preventing withdrawal of said contacts from said bore, said tab means including surface means engageable upon entry into said bore from the ends thereof for deflecting said tab means away from said abutments of said contacts and permitting withdrawal of said contacts.

2. A device as recited in claim 1 in which said retainer member includes a sleeve portion, said sleeve portion being longitudinally split, the periphery of said sleeve portion engaging the circumferential surface of the bore in said bus receiving said retainer member for forming an electrical connection with said bus.

3. A device as recited in claim 1 in which each of said contacts includes a pin portion at one end thereof, said pin portions of said contacts facing toward each other and being in a spaced relationship.

4. A device as recited in claim 3 in which said means of said retainer member engaging said contacts includes portions engaging said pin portions in an electrically conductive relationship with said pin portions.

5. A device as recited in claim 4 in which said portions of said retainer member include abutments limiting the movement of said contacts toward each other.

6. An electrical terminal junction device comprising a body of dielectric material,
a bus in said body,
a plurality of bores extending through said body and said bus,
a retainer member in each of said bores, each of said retainer members including a sleeve portion engaging said bus in the bore therefor in an electrically conductive relationship therewith, means holding said retainer members in said bores,
and a duality of electrical contacts in at least some of said bores, such dualities of contacts extending into said bores from the opposite ends thereof, said contacts having peripheral portions engaging said retainer member and providing an electrical connection therewith, each of said contacts having a shoulder facing the adjacent end of said bore, each of said retainer members having resilient tab means inclined toward said contacts and engaging said contacts adjacent said shoulders for preventing withdrawal of said contacts, said tab means having surface portions engageable from the adjacent end of said bore for deflecting said tab means outwardly for releasing said shoulder and permitting withdrawal of said contacts.

7. A device as recited in claim 6 in which said sleeve portion has outwardly flaring substantially frustoconical opposite end portions, said bores in said body including shoulders therein adjacent and outwardly of the distal edges of said end portions for thereby holding said retainer members in said bores.

8. A device as recited in claim 6 in which each of said contacts includes
a forward, an intermediate and a rearward portion,
said forward portions of said dualities of contacts being adjacent and in a spaced relationship,
said intermediate portions providing said peripheral portions engaging said retainer member,
said shoulders of said contacts being between said intermediate and rearward portions.

9. A device as recited in claim 8 in which
each of said contacts includes an additional shoulder between said intermediate portion and said forward portion,
said retainer member having an abutment adjacent each of said additional shoulders for preventing movement of said contacts inwardly of said retainer member.

10. An electrical termination device comprising
a body of dielectric material,
a bus in said body,
said body and said bus having a plurality of bores therethrough,
a retainer member in each of said bores,
each of said retainer members including a longitudinally split tubular portion,
said tubular portion engaging said bus at the periphery of the bore therethrough,
means holding each of said retainer members in said bore,
and a duality of electrical contacts in at least some of said bores,
said contacts extending therein from opposite ends of said bores,
each of said contacts including a rearward portion, an intermediate portion and a forward portion,
said intermediate portion being of larger diameter than said rearward and forward portions and engaging the periphery of said tubular portion for effecting an electrical connection therewith,
each of said contacts having
a forward shoulders between said intermediate portion and said forward portion thereof and a rearward shoulder between said intermediate portion and said rearward portion thereof,
said retainer member including means adjacent said forward shoulder for precluding forward movement of each of said contacts
and including resilient tab means adjacent said rearward shoulders of said contacts for precluding rearward movement of said contacts,
said tab means including surfaces engageable from the adjacent ends of said bores for permitting said tab means to be deflected outwardly away from said rearward shoulders for releasing said contacts for movement rearwardly and withdrawal from said bore.

11. A device as recited in claim 10 in which for said means for holding said retainer member in said bore said bore is provided with an intermediate enlarged portion defining shoulders at the ends thereof, said retainer member having edges adjacent said shoulders and retained thereby.

12. A device as recited in claim 10 in which said means adjacent said forward shoulder of each of said contacts includes
an element directed generally radially inwardly from one side of said retainer member and engaging one side of said forward portion of said contact,
and an additional element directed generally radially inwardly from the opposite side of said retainer member and engaging the opposite side of said forward portion,
whereby said inwardly directed elements provide an additional electrical connection with said contact.

13. A device as recited in claim 12 in which one of said generally radially inwardly directed elements comprises a localized domelike protuberance on said retainer member, and in which the other of said generally radially inwardly directed elements comprises at least one forwardly inclined resilient tab.

14. A device as recited in claim 12 in which one of said generally radially inwardly directed elements includes a circumferential portion of said tubular portion displaced inwardly toward the axis of said tubular portion so as to present a surface adjacent said forward shoulder of said contact and a surface in engagement with said forward portion of said contact.

15. A device as recited in claim 14 in which the other of said generally radially inwardly directed elements includes a duality of longitudinally extending flanges attached to said retainer member at said longitudinal split thereof and extending inwardly therefrom toward the axis of said retainer member and engaging the periphery of said forward portion of said contact along the inner edges of said flanges.

16. A feed-through terminal junction device comprising
a body of dielectric material,
bus means in said body,
said body and said bus means collectively having a plurality of openings therethrough,
each of said openings having a portion in said bus means and a portion in said body,
said portions of said openings in said bus means being intermediate the ends of said openings,
a duality of contacts in at least some of said openings, the contacts of each of said dualities of contacts extending into one of said openings from the opposite ends thereof,
each of said duality of contacts being in electrically conductive relationship with said bus means,
and retainer means in said body holding said contacts against movement outwardly of said openings,
said contacts being provided with abutment means facing outwardly of said openings,
and said retainer means including resilient tabs adjacent said abutment means for thereby holding said contacts against movement outwardly of said openings.

17. A device as recited in claim 16 in which
said retainer means includes sleeves,
said sleeves being longitudinally split,
said openings having enlarged portions inwardly of the ends thereof,
defining shoulders between said enlarged portions and the remaining portions of said openings,
said sleeves being in said enlarged portions and prevented from movement outwardly of said openings by said shoulders,
said resilient tabs extending inwardly from said sleeves.

18. A feed-through electrical terminal device comprising
a body of dielectric material,
said body having a plurality of openings extending therethrough,
each of said openings having an enlarged portion intermediate the ends thereof defining abutments at the ends of said enlarged portions,
a duality of electrical contacts in at least some of said openings,
said contacts extending therein from opposite ends of said openings,
each of said contacts including a rearward portion, an intermediate portion, and a forward portion,
said intermediate portion being of larger lateral dimension than said rearward and forward portions,
thereby defining a forward shoulder between said intermediate portion and said forward portion, and a rearward shoulder between said intermediate portion and said rearward portion,
a retainer member in each of said enlarged portions,
each of said retainer members including opposite end portions adjacent said abutments of the opening receiving the same,
whereby said abutments hold said retainer members in said enlarged portions of said openings,
each of said end portions being adjacent a contact and further including a resilient tab means extending inwardly to a position adjacent the rearward shoulder of said adjacent contact for preventing rearward movement of said contact,
said tab means including surfaces engageable from the adjacent ends of said openings for permitting said tab means to be deflected outwardly away from said rearward shoulders for releasing said contacts for movement rearwardly and withdrawal from said openings,
means on said retainer members engaging said contacts and providing an electrical connection therewith,
abutment means adjacent said forward shoulders for preventing forward movement of said contacts,
and bus means in said body in electrically conductive relationship with said retainer members for providing a means electrically connecting together the contacts in various openings in said body.

19. A device as recited in claim 18 in which said means on said retainer members engaging said contacts include inwardly extending portions engaging said forward portions of said contacts.

20. A device as recited in claim 18 in which said means on said retainer members engaging said contacts include portions engaging the peripheries of said intermediate portions of said contacts.

21. A device as recited in claim 18 in which said abutment means adjacent said forward shoulders include elements extending laterally inwardly of said retainer members, said elements presenting edge surfaces adjacent said forward shoulders for thereby preventing forward movement of said contacts.

References Cited

UNITED STATES PATENTS

| 2,089,856 | 8/1937 | Reynolds | 339—119 X |
| 2,255,553 | 9/1941 | Funk | 339—205 X |
| 2,380,916 | 8/1945 | Beal | 339—205 |
| 2,956,107 | 10/1960 | Monashkin | 339—205 X |
| 3,358,266 | 12/1967 | Chandler et al. | 339—205 |

OTHER REFERENCES

"Continental Connectors Solderless Terminal Blocks," Continental Connector Corporation, Woodside, N.Y., pp. 1–5.

RICHARD E. MOORE, Primary Examiner.

U.S. Cl. X.R.

339—205, 217